United States Patent [19]

Löffler

[11] Patent Number: 4,469,011

[45] Date of Patent: Sep. 4, 1984

[54] PRESSURE CONTROL DEVICE FOR THE ACTUATION OF A CLUTCH OR BRAKE

[75] Inventor: Alfons Löffler, Friedrichshafen, Fed. Rep. of Germany

[73] Assignee: Zahnradfabrik Friedrichshafen, AG., Friedrichshafen, Fed. Rep. of Germany

[21] Appl. No.: 293,989

[22] Filed: Aug. 18, 1981

[30] Foreign Application Priority Data

Aug. 19, 1980 [DE] Fed. Rep. of Germany ....... 3031262

[51] Int. Cl.³ .......................................... F15B 13/043
[52] U.S. Cl. ........................................ 91/433; 91/461; 91/469; 137/625.6; 192/52
[58] Field of Search ................... 91/433, 453, 461, 468, 91/469; 137/625.6, 625.66; 192/52

[56] References Cited

U.S. PATENT DOCUMENTS

| | | | |
|---|---|---|---|
| 3,559,669 | 2/1971 | Dach | 192/52 |
| 3,583,422 | 6/1971 | Dach et al. | 91/433 |
| 3,674,121 | 7/1972 | Copeland | 192/52 |
| 3,999,462 | 12/1976 | Chamberlain | 91/468 |
| 4,111,283 | 9/1978 | Hastings, Jr. | 91/433 |
| 4,139,015 | 2/1979 | Sakai | 91/461 |
| 4,281,676 | 8/1981 | Morris | 91/469 |

FOREIGN PATENT DOCUMENTS

| | | |
|---|---|---|
| 1223265 | 8/1960 | Fed. Rep. of Germany . |
| 2535632 | 6/1977 | Fed. Rep. of Germany . |
| 2512778 | 9/1977 | Fed. Rep. of Germany . |
| 924115 | 4/1963 | United Kingdom . |
| 1234388 | 6/1971 | United Kingdom . |

Primary Examiner—Robert E. Garrett
Assistant Examiner—Richard L. Klein
Attorney, Agent, or Firm—Karl F. Ross; Herbert Dubno

[57] ABSTRACT

A hydraulic control device for the pressurization of a clutch or the like for a transmission operable under load comprises a spool-type valve displaceable in one direction to pressurize the clutch and in the opposite direction to vent the same. The valve spool operates with a damping piston which receives the clutch pressure buildup and acts against a control piston which, in turn, is displaced by an operative valve. According to the invention, the pressure head is maintained substantially constant by providing a sleeve or bushing within the damping piston chamber which bears against the spool by a spring and which can be biased by a spring between the damping piston and the sleeve.

3 Claims, 3 Drawing Figures

FROM LOAD

PRESSURE CONTROL DEVICE FOR THE ACTUATION OF A CLUTCH OR BRAKE

FIELD OF THE INVENTION

My present invention relates to a device for the actuation of a hydraulic brake or clutch, especially for a speed-change transmission and particularly for a transmission operable under load and for which a controlled, time-delayed pressurization is desired.

BACKGROUND OF THE INVENTION

In multispeed gear transmissions using, for example, a plurality of planetary gear sets whose members must be selectively connected together, braked or connected to various shafts, it is a common practice to provide friction clutches or brakes to effect the interconnection. Such transmissions are frequently operated under load, i.e. neither the load on the output side of the transmission nor the driving torque at the input side of the transmission is decoupled from the gearing during shifting.

Such friction clutches or brakes, hereinafter referred to as friction devices, are generally operated with rising pressure which can result in a sharp torque increase during gear change, especially if the coefficient of friction of the device has a rising gradient or characteristic.

A conventional control arrangement for operating such friction devices is disclosed, for example, in German Pat. No. 25 12 778. This system likewise hydraulically energizes the clutch or brake with a rising pressure although it provides controlled or time-delayed pressurization.

In the device of this patent, a spool-type valve is provided which has, upon the valve slider, a pair of spools adapted respectively to control the connection of a pressurization passage and a venting passage with a passage communicating with the clutch.

This slider is acted upon by clutch pressure against a spring force and is associated with a damping piston movably mounted in the housing of the valve and defining an expandable chamber which communicates with the clutch via a rotor and a check valve.

The diameter of the samping piston, which acts against the slider spring, is greater than the diameter of the slider affected by the clutch pressure so that ultimately the pressure buildup in the expandable chamber will result in an engagement by the damping piston with the spool and a full displacement of the latter into the open position allowing full pressurization of the clutch.

The device can also include a piston, generally a differential piston, displaced by spring pressure toward the spool and biased by the output of a control valve away from the spool so that the pressure spring can urge the spool toward this differential piston thereby communicating the pressure port of the valve with the clutch or brake and blocking the venting port.

In operation, when the differential piston is shifted by the control pressure, the spool is shifted by the spring force and the fluid is permitted to flow from the pressure port to the clutch. The pressure buildup in the clutch, however, is retarded because hydraulic fluid is simultaneously bled through the throttle into the expandable compartment to displace the damping piston which is shifted against the force of the spring toward the spool.

Once the damping piston engages the spool, however, it entrains the latter into its fully open position and a sharp pressure buildup can occur in the clutch or brake. The check valve permits reverse flow of the fluid from the expandable chamber when the clutch or brake is deenergized.

With this system a retarded pressure buildup in the clutch or brake can be ensured but the pressure buildup nevertheless is characterized by a rising pressure.

OBJECT OF THE INVENTION

It is the principal object of the present invention to provide an improved control device for operating a friction brake or clutch for a transmission shiftable under load which obviates disadvantages of the aforedescribed system and represents an improvement thereover with respect to the possibility of operating the clutch or brake with a pressure head which is substantially constant or with a delayed transition from operating pressure to system pressure.

SUMMARY OF THE INVENTION

This object and others which will become apparent hereinafter are attained, in accordance with the present invention, with an arrangement of the type described but further provided with a sleeve or bush which is mounted in the housing of the damping piston and which forms a seat for a further spring bearing upon the slider. In addition, still another spring can be provided which is seated against an actuating member slidable in this sleeve or bushing and which can bear upon the slider.

With the sleeve and the additional spring, where the valve slider projects through the sleeve for entrainment by the damping piston, it has been found that the pressure head generated during operation of the clutch or brake remains substantially constant at least until the damping piston engages the slider and brings about a sharp increase to sustain pressure.

With an additional sliding member in the sleeve, depending upon the dimensioning, i.e. the space between the valve slider and this member, it is possible to ensure a gradual increase to system pressure without any sudden jump or a sudden increase with a timing that can be precisely determined.

The system has been found to be particularly effective if the characteristic of the coefficient of friction of the clutch disks has a particularly steep gradient. The more gradual increase to the system pressure has been found to be expected and serves to reduce shock transmission in the system in the event of improper speed selection.

Both of the embodiments described can be used alone or in combination with the system of German Pat. No. 25 12 778 in a single control block of a selection device for speed-shifting purposes depending upon the friction characteristics of the clutch disks.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
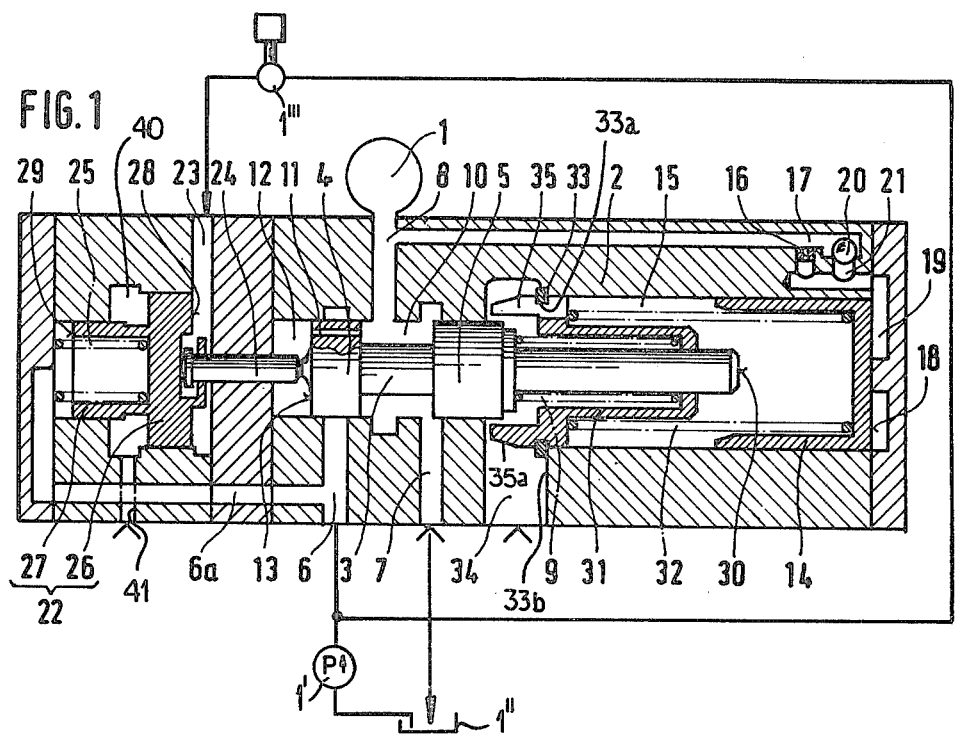
FIG. 1 is an axial cross sectional view of a hydraulic control device according to the present invention.

In FIG. 1 of the drawing, I have shown a device for the time-delayed pressurization of a clutch or brake 1 or system pressure generated by a pump 1' drawing the hydraulic fluid from a reservoir 1", the control device being one of a plurality of such controls utilized for the selective operation of friction clutches or brakes in a speed-changing transmission for an automotive vehicle and preferably of a transmission shiftable under load by the selective coupling, braking and decoupling of planetary gear elements.

The device shown in FIG. 1 can be operated by a valve 1''', which can be of the magnetically energized type, by a vehicle operator and/or by an automatic speed-changing system.

The device serves for the controlled time-delayed pressure buildup in the clutch so that, for example, the clutch of this device can be progressively disengaged, thereby allowing speed change and switchover between transmission element without sudden shocks between the engine and the load, e.g. the driving wheels of the vehicle.

The housing 2 can be formed with a bore receiving a slider 3 forming a spool-type valve and having a first spool 4 and a second spool 5 axially spaced apart.

The first spool 4 serves to open and close a feed passage 6 which is connected to the pump 1' and thus serves as the pressure port of the valve, either connecting this port to or disconnecting it from a chamber 10 formed in the bore of the valve and communicating by the load port 8 with the clutch or brake 1.

Similarly, the second spool 5 opens or closes communication between this chamber and a further port 7 which can be connected to the reservoir 1".

Thus, when the communication between port 6 and chamber 10 is opened, hydraulic fluid can flow to the clutch 1 to pressurize the latter and, when communication is established between port 7 and chamber 10, hydraulic fluid can be drained from the clutch to the reservoir and the clutch deenergized.

The spool 4 is provided with a throttle passage 11 which communicates between the chamber 10 and a chamber 12 in which the left-hand end of the slider 3 is exposed so that a pressure buildup in chamber 12 exerts a force upon the slider 3 to the right. Such a force is generated when chamber 10 communicates with port 6 and port 7 is blocked. The force upon the face 13 of the slider 3 acts counter to an inner compression spring 9 which bears upon the spool 5 in the opposite direction and is seated against a sleeve 31 surrounding a stem of the slider 3.

The displacement of the slider 3 is controlled by a differential piston 22 having two steps 26 and 27.

The face 28 of the large-diameter step 26 can be subjected to hydraulic pressure through a control port 23 receiving the fluid from valve 1'''. The resulting hydraulic force tends to displace the piston 22 to the left. This piston is coupled with a pin 24 so that movement of piston 22 to the left retracts the pin 24 from the slider 3 and allows the latter to be displaced by the spring 9 to the left from the position shown in the drawing in which chamber 12 is relieved because port 7 is connected to the reservoir and communicates with chambers 10 and 12. This permits blockage of the port 7 and unblocking of the port 6.

The differential piston 22 is biased to the right by a compression spring 25 and by the pressure at port 6 which is applied to the small-diameter face 29 via the passage 6a.

Thus, at its left-hand side, the effective area of the piston 22 is insufficient to develop enough force to resist displacement of the piston 22 to the left upon the application of pressure to the face 28.

The opposite side of the large-diameter portion 26 of this piston, within the chamber 40, is vented via the port 41.

Upon the relieving of pressure at port 23, the system pressure applied to face 29 and the force of spring 25 can serve to shift the spool 3 to the right.

However, when port 23 receives pressure, piston 22 shifts to the left and is followed by the slider 3 to energize the clutch 1.

A damping piston 14 is axially displaceable in a large-diameter bore of the housing 2 at the opposite end of the slider 3.

With this bore I also provide a bushing or sleeve 31, the left-hand end of the sleeve encompassing the second spool 5 of the slider. This sleeve forms a seat for an outer pressure spring which bears against the damping piston 14. The inner spring 9, previously mentioned, is seated against the sleeve 31 and bears against the spool 5.

Spring 9, in addition to biasing the slider 3 to the left, urges the sleeve 31 to the right to seat a support ring 33 in an outwardly open peripheral groove 33a of the sleeve, against an end face 33b of the housing 2.

To permit the ring 33 to be fitted over the sleeve, the latter may be tapered or of conical configuration as shown at 35a at its left-hand end. An axial channel 35 in the sleeve prevents buildup of pressure in the bore 15 between the sleeve and the damping piston 14.

The passage 8 is connected via a channel 17 with a chamber (expandable chamber) 19 at the right-hand end of the damping piston 14 through a throttle 16 and a check valve 20 in a radial passage 21.

Consequently, as line 8 is pressurized in the manner described above, the clutch 1 is filled and simultaneously the fluid bleeds through the throttle 16 into chamber 19 to displace the damping piston 14 to the left. During this process, slider 3 is affected by the spring 9 so that a change in spring force does not result from movement of the damping piston 14 and an essentially uniform operating pressure is guaranteed at the clutch in spite of the fact that filling is retarded by the gradual expansion of chamber 19.

Only upon engagement by the piston 14 of the end 30 of the slider 3 is the slider entrained into its fully open position to suddenly increase the pressure in the clutch to system pressure.

The check valve 20 allows rapid emptying of chamber 19 upon deenergization of the clutch.

Figure 2:
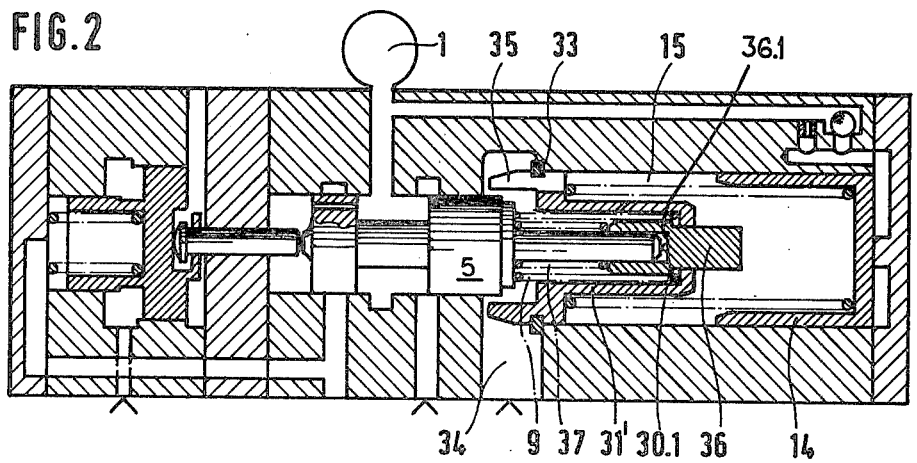
FIG. 2 is a similar view illustrating another embodiment of the delayed pressurization device.

In the embodiment of FIG. 2, the sleeve 31', which corresponds to the sleeve 31 of FIG. 1, receives yet another sliding element 36, which is disposed between the end 30.1 of the slider 3 and the piston 14. This slider 36 is seated against a further compression-type coil spring 37 which bears against the spool 5.

The distance between the face 36.1 and the face 30.1 may be selected at will. For example, it can be made, in accordance with the invention, so great that the member 36 will never engage the abutment 30.1 before the slider is fully open. Consequently, even though the piston 14 engages the slider 36, the operating pressure will increase gradually to the system pressure without any sharp increase.

Alternatively, the spacing may be dimensioned so that, after a predetermined shift of slider 36, the surfaces 36.1 and 30.1 engage with continued movement of the piston 14 to the left. In this case, the pressure in the clutch will increase gradually until entrainment occurs, whereupon the pressure will increase sharply in the manner described.

Figure 3:
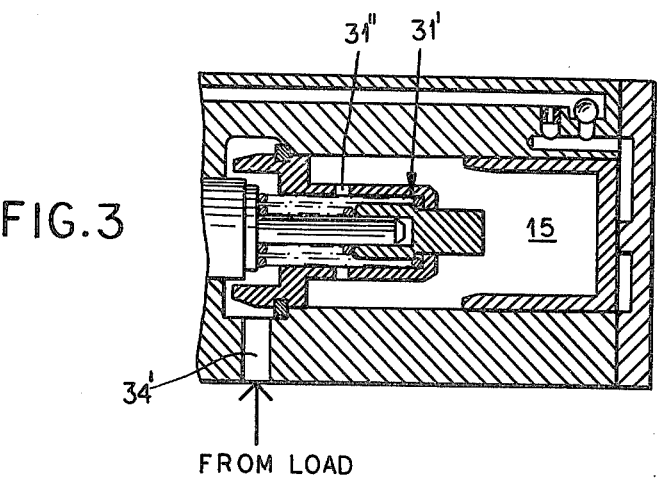
FIG. 3 is a fragmentary section illustrating a modification of the device of FIG. 2.

The embodiment of FIG. 3 enables load-dependent modulation of the movement of the damping piston 14 but providing a load dependent pressure through a port 34; which can replace the venting ports 34 of the embodiments of FIGS. 1 and 2, the pressure being communicated to the chamber 15 through perforations 31" in the sleeve 31'. This pressure modulation can supplement or replace the force delivered by the outer pressure spring 32.

I claim:

1. A hydraulic control for the delayed pressurization of a hydraulically operated friction brake or clutch forming a speed-changing device for a transmission shiftable under load, said control comprising:
   a housing formed with a bore;
   a spool slider shiftable in said bore and having two spools, said housing being provided with a fluid pressure port, a vent port and a port connectable to said device, one of said spools selectively controlling communication between said pressure port and said port connectable to said device, the other of said spools selectively connecting the latter port to said vent port;
   means in said housing for applying fluid pressure of said device to said slider in one direction;
   means forming a damping chamber in said housing receiving a damping piston shiftable against a yieldable force to expand and contract said chamber;
   a passage formed in said chamber communicating between said port connectable to said device and communicating via a throttle and a check valve in parallel to said throttle with said chamber;
   a cup-shaped member in said housing forming a sleeve surrounding said slider, means being provided to secure said cup-shaped member to said housing in said one direction;
   at least one spring in said sleeve braced against said sleeve and bearing upon said slider for biasing said slider in a direction opposite said one direction; and
   an outer spring surrounding said sleeve and seated thereon, said outer spring bearing upon said damping piston and biasing same in a direction tending to contract said chamber, said sleeve being formed with a ring engaging said housing.

2. A hydraulic control for the delayed pressurization of a hydraulically operated friction brake or clutch forming a speed-changing device for a transmission shiftable under load, said control comprising:
   a housing formed with a bore;
   a spool slider shiftable in said bore and having two spools, said housing being provided with a fluid pressure port, a vent port and a port connectable to said device, one of said spools selectively controlling communication between said pressure port and said port and said port connectable to said device, the other of said spools selectively connecting the latter port to said vent port;
   means in said housing for applying fluid pressure of said device to said slider in one direction;
   means forming a damping chamber in said housing receiving a damping piston shiftable against a yieldable force to expand and contract said chamber;
   a passage formed in said chamber communicating between said port connectable to said device and communicating via a throttle and a check valve in parallel to said throttle with said chamber;
   a cup-shaped member in said housing forming a sleeve surrounding said slider, means being provided to secure said cup-shaped member to said housing in said one direction;
   at least one spring in said sleeve braced against said sleeve and bearing upon said slider for biasing said slider in a direction opposite said one direction;
   an outer spring surrounding said sleeve and seated thereon, said outer spring bearing upon said damping piston and biasing same in a direction tending to contract said chamber, said sleeve being formed with a ring engaging said housing; and
   means for applying load-dependent hydraulic pressure to a side of said damping piston opposite said chamber.

3. A hydraulic control for the delayed pressurization of a hydraulically operated friction brake or clutch forming a speed-changing device for a transmission shiftable under load, said control comprising:
   a housing formed with a bore;
   a spool slider shiftable in said bore and having two spools, said housing being provided with a fluid pressure port, a vent port and a port connectable to said device, one of said spools selectively controlling communication between said pressure port and said port connectable to said device, the other of said spools selectively connecting the latter port to said vent port;
   means in said housing for applying fluid pressure of said device to said slider in one direction;
   means forming a damping chamber in said housing receiving a damping piston shiftable against a yieldable force to expand and contract said chamber;
   a passage formed in said chamber communicating between said port connectable to said device and communicating via a throttle and a check valve in parallel to said throttle with said chamber;
   a cup-shaped member in said housing forming a sleeve surrounding said slider, means being privided to secure said cup-shaped member to said housing in said one direction;
   at least one spring in said sleeve braced against said sleeve and bearing upon said slider for biasing said slider in a direction opposite said one direction;
   an outer spring surrounding said sleeve and seated thereon, said outer spring bearing upon said damping piston and biasing same in a direction tending to contract said chamber, said sleeve being formed with a ring engaging said housing; and
   a slidable member received in said sleeve and spaced from an end of said slider; and
   a further spring within said sleeve between said member and said slider.

* * * * *